United States Patent [19]
Hill et al.

[11] Patent Number: 5,308,112
[45] Date of Patent: May 3, 1994

[54] UNFURLED SIDE IMPACT AIR BAG

[75] Inventors: Timothy W. Hill, Troy; Jeffrey A. Welch, St. Clair Shores; Ian V. Lau, Troy; Kenneth H. Desaele, Utica, all of Mich.

[73] Assignee: General Motors Corporation, Detroit, Mich.

[21] Appl. No.: 49,332

[22] Filed: Apr. 21, 1993

[51] Int. Cl.⁵ .............................................. B60R 21/22
[52] U.S. Cl. ............................ 280/730 A; 290/728 R; 290/730 R; 290/728 A
[58] Field of Search ........... 280/728 R, 730 R, 728 A, 280/730 A; 244/121, 122 AG

[56] References Cited

U.S. PATENT DOCUMENTS

| | | | |
|---|---|---|---|
| 3,603,535 | 9/1971 | DePolo | 280/730 R |
| 3,791,667 | 2/1974 | Haviland | 280/730 A |
| 4,173,356 | 11/1979 | Ross | 280/728 R |
| 4,946,191 | 8/1990 | Putsch | 280/730 |
| 4,966,388 | 10/1990 | Warner et al. | 280/730 |
| 5,039,035 | 8/1991 | Fitzpatrick | 280/730 R X |
| 5,072,966 | 12/1991 | Nishitake et al. | 280/730 |

FOREIGN PATENT DOCUMENTS

4119788A1 7/1992 Fed. Rep. of Germany .......... B60R 21/22

OTHER PUBLICATIONS

Yngve Haland, Electrolux Autoliv AB, "Side Impact Protection By Airbag and Padded Door", pp. 311-315 of Automotive Technology International '92 pub. (pp. 85-101).

Charles Y. Warner; Charles E. Strother, Michael B. James, Donald E. Struble, Timothy P. Egbert, Collision Safety Engineering, "Crash Protection in Near-Side Impact Advantages of a Supplemental Inflatable Restraint", Paper #890602.

*Primary Examiner*—Margaret A. Focarino
*Assistant Examiner*—Christopher P. Ellis
*Attorney, Agent, or Firm*—Todd L. Moore; C. E. Leahy

[57] ABSTRACT

A side impact air bag mounted in a door of a motor vehicle in an unfurled, deflated position for reducing deployment time and providing reliable orientation of the air bag upon deployment. The air bag is mounted in an upper portion of the door, and an actuable inflator is mounted in the lower portion of the door. The inflator is in communication with the air bag via a connecting air bag or flexible duct, which provides added padding to the door upon inflation. A soft flexible material overlies the air bag to hide the air bag from the occupant's view as well as retain the air bag in the unfurled position. The soft flexible material is adhesively attached or stapled to an inner trim panel of the door and becomes detached from the inner trim panel upon the air bag inflating and pushing the soft flexible material away from the inner trim panel so that the air bag reaches its inflated position. A second embodiment provides the soft flexible material with a weakened portion that tears upon the air bag inflating and pushing the soft flexible material away from the inner trim panel of the door.

7 Claims, 2 Drawing Sheets

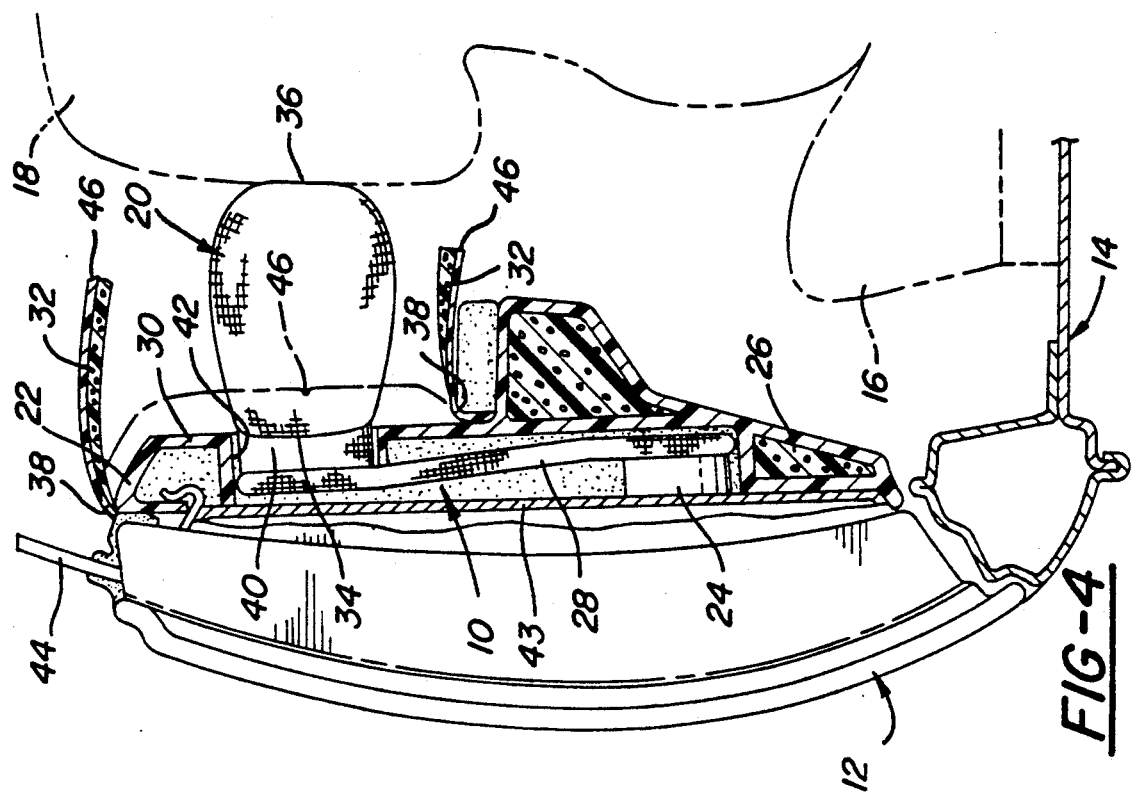
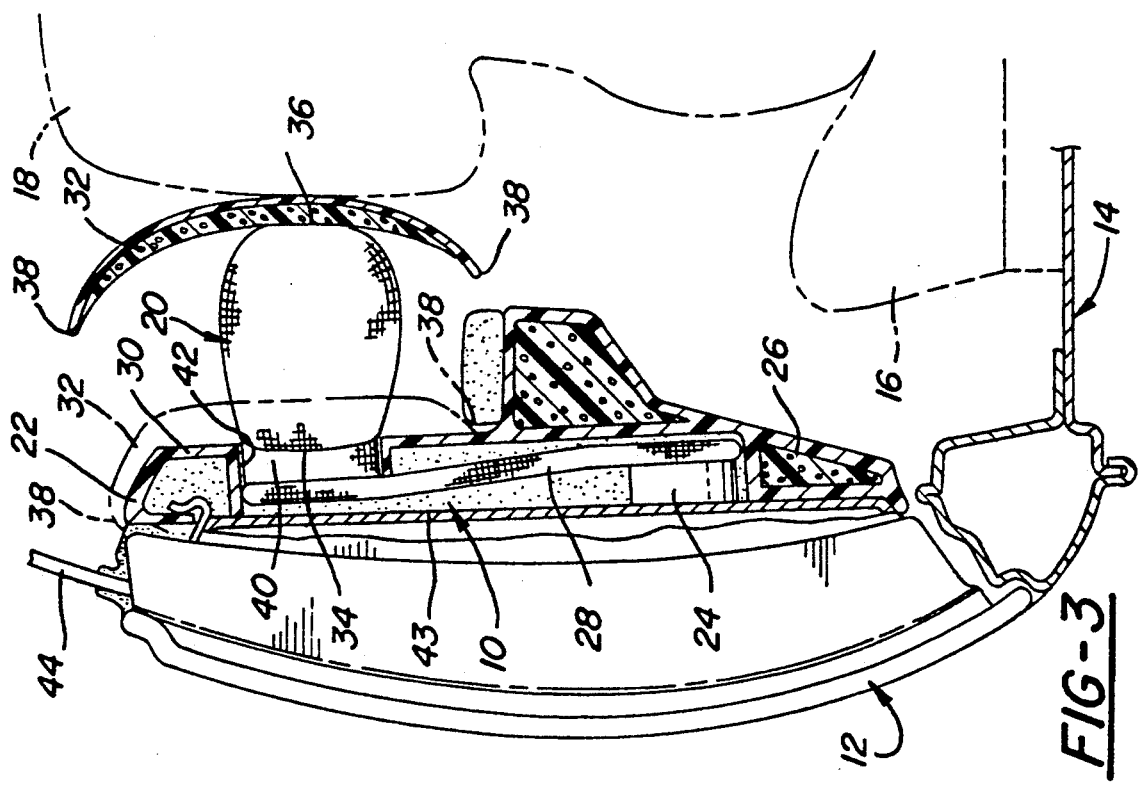

UNFURLED SIDE IMPACT AIR BAG

The invention relates to a vehicle air bag and more particularly an unfurled, deflated air bag mounted along the door of the vehicle that deploys into the space between the seated occupant and the door.

BACKGROUND OF THE INVENTION

It is well known in motor vehicles to provide an inflatable air bag to cushion an occupant.

The prior art has recognized that such an air bag may be mounted on a vehicle door to provide such cushioning in a side impact situation. Such air bags are typically folded or furled in a compact position requiring the air bag to unfurl and unfold upon deployment and assume an inflated position.

It would be desirable to mount a side air bag in an unfurled, deflated position in order to reduce deployment time and provide reliable orientation of the side air bag upon inflation.

SUMMARY OF THE INVENTION

According to the present invention, an air bag is mounted in a vehicle door in an unfurled, deflated position extending along the length of the door. The unfurled air bag requires less deployment time since the air bag does not have to unfold or unfurl upon deployment. The unfurled position also provides a reliable orientation of the air bag upon deployment since the air bag need not unfold or unfurl to a designated position.

In the preferred form, the unfurled air bag is mounted in an upper portion of a vehicle door, and a conventional inflater is mounted in a lower portion of the door. The inflater is in communication with the air bag via a connecting air bag or flexible duct. When inflated, the connecting air bag provides added padding to the door.

The air bag is retained within a cavity provided between an inner trim panel of the door and a soft trim material. The soft trim material overlies the air bag to retain the air bag in the unfurled position and to hide the air bag from an occupant's view. Upon deployment, the soft trim material yields to the inflating air bag thereby allowing the air bag to fill the space between the seated occupant and the door. The soft trim material may be adhesively attached or stapled to the inner trim panel of the door so that the soft trim material detaches from the inner trim panel upon the air bag inflating and pushing the soft trim material away from the door. An additional embodiment provides the soft trim material with a weakened portion so that the soft trim material tears at the weakened portion upon the air bag inflating and pushing the soft trim material away from the door while the periphery of the soft trim material remains attached to the inner trim panel.

Thus, the object of the present invention is to provide a new and improved side air bag that is mounted in an unfurled, deflated position extending along the length of a vehicle door to reduce deployment time and provide reliable orientation of the side air bag upon deployment.

BRIEF DESCRIPTION OF THE DRAWINGS

FIG. 3 is a section view of the vehicle door showing the side air bag in the deployed condition and showing the periphery of the soft trim material detached from its connection to the inner trim panel.

FIG. 4 is a section view of the vehicle door showing the side air bag in the deployed position and showing the soft trim material torn along a predetermined weakened position.

DESCRIPTION OF THE PREFERRED EMBODIMENT

Figure 1:
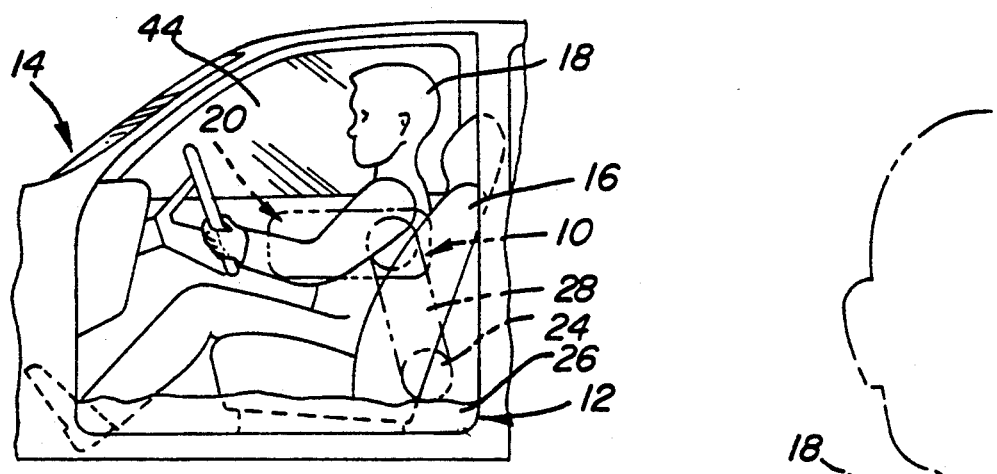
FIG. 1 is a side elevation view of a vehicle according to the present invention showing the side air bag assembly in the vehicle door.

As seen in FIG. 1, an air bag assembly (10) is mounted along the length of a door (12) of a conventional motor vehicle (14) adjacent to a conventional seat (16) for the seating of an occupant (18). The air bag assembly (10) includes an air bag (20) mounted in an upper portion (22) of the door (12), and an actuable inflator (24) mounted in a lower portion (26) of the door (12). The inflator (24) is in communication with the air bag (20) via a connecting air bag or flexible duct (28). Although the inflater (24) and connecting air bag (28) may be mounted at any convenient location within the door (12), it should be noted that the connecting air bag (28) provides added padding to the door (12) upon inflation, and therefore, the connecting air bag (28) should be mounted accordingly. Also, the connecting air bag (28) may connect and communicate anywhere along the length of the air bag (20). The length of the air bag (20) may vary depending on the requirements of the specific motor vehicle (14).

Figure 2:
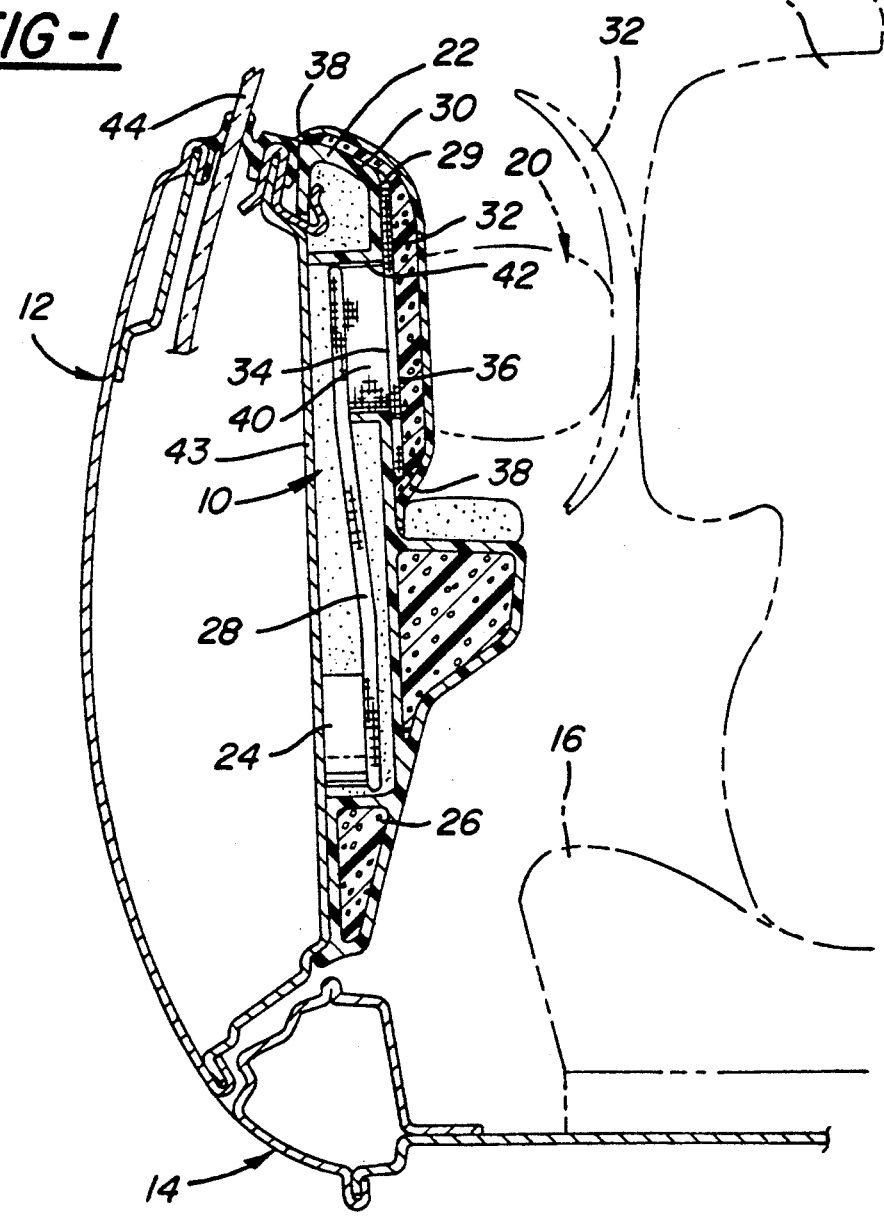
FIG. 2 is a section view of the vehicle door showing the side air bag and the soft trim material in the stored position and showing in phantom line, the side air bag in the deployed position.

When in a stored, deflated and flattened position, the air bag (20) is retained in a cavity (29) provided between an inner trim panel (30) of the door (12) and a soft flexible material (32), as seen in FIG. 2. The air bag (20) has a back side (34) and a front side (36) that are adjacent and substantially parallel to each other and the cavity 29 has a height which is not less than the heights of the back side 34 and front side 36, so that the air bag (20) is completely flattened and unfolded along the entire length of the air bag (20) in the stored position within cavity 29. The soft flexible material (32) overlies the air bag (20) and is connected to the inner trim panel (30) of the door (12) at an outer edge or periphery (38) of the soft flexible material. A conventional adhesive or staple (not shown) is utilized to connect the outer edges (38) of the soft flexible material (32) to the inner trim panel (30). The soft flexible material (32) hides the air bag (20) from the occupant's (18) view and retains the air bag (20) in its unfurled position.

The air bag (20) has a neck portion (40) that is sewn directly to the connecting air bag (28). The inner trim panel (30) provides an aperture or tunnel (42) by which the neck portion (40) of the air bag (20) extends therethrough. In an additional embodiment, the neck portion (40) comprises a steel cylinder (not shown) which bolts onto the inner trim panel (30) and connects and communicates with the air bag (20) and the connecting air bag (28).

The connecting air bag (28) is substantially elliptical and stored in an unfurled and unfolded position between the inner trim panel (30) and an inner door panel (43). The connecting air bag (28) is connected to the air bag (20) and extends downward to connect with the inflater (24). The inflater (24) is mounted to the inner door panel (43) in the lower portion (26) of the door (12). The flexibility of the connecting air bag (28) allows the inflater (24) and connecting air bag (28) to be mounted within the door (12) wherever design considerations allow. When inflated, the connecting air bag (28) provides additional padding from the inner door panel (43).

Upon the air bag (20) deploying to an inflated position, as seen in FIGS. 3 and 4, the soft trim material (32) yields to allow the air bag (20) to expand to the inflated position. The adhesive strength of the adhesive or the connecting strength of the staple to the soft trim material (32) and the inner trim panel (30) is such that upon deployment of the air bag (20), the air bag (20) pushes the soft trim material (32) away from the inner trim panel (30) of the door (12) and causes the edges (38) of the soft trim material (32) to detach from the inner trim panel (30), as seen in FIG. 3. With the soft trim material (32) detached from the inner door panel (30), the air bag (20) is allowed to fully expand to its substantially cylindrical inflated position, wherein the air bag (20) remains below the window (44) of the door (12). It should be noted that the present invention is not limited to having the air bag (20) below the window (44) of the door (12) when fully inflated.

As seen in FIG. 4, another embodiment provides the soft flexible material (32) with a weakened portion (46) along the length of the soft trim material (32). Upon inflation of the air bag (20), the air bag (20) pushes the soft trim material (32) away from the inner trim panel (30), and the soft trim material (32) tears at the weakened portion (46). The air bag (20) is then allowed to fully expand to its substantially cylindrical inflated position below the window (44) of the door (12). The edges of the soft trim material (32) are adhesively attached or stapled to the inner trim panel (30) but remain attached upon the air bag (20) deploying to the inflated position.

Storing the air bag (20) in an unfolded or unfurled position reduces the deployment time of the air bag (20) when compared to conventional air bags that are folded or furled in a stored position since the air bag (20) does not require additional time to unfold and unfurl upon deployment. Also, by not having to unfold and unfurl to an inflated position, the air bag (20) provides for reliable orientation upon deployment.

It should be noted that the present invention is not limited to any particular door of the motor vehicle and can be utilized on any passenger door of a motor vehicle. The present invention may also be utilized within any area of the vehicle that is adjacent to a passenger, such as a rear quarter panel of a two door vehicle wherein the side impact air bag would be adjacent to a passenger sitting in the rear seat. Thus, it is seen that the invention provides a new and improved side impact air bag that is mounted in an unfurled, deflated position extending along the length of a vehicle door to reduce deployment time and provide reliable orientation of the side air bag upon deployment.

The embodiments of the invention in which an exclusive property or privilege is claimed are defined as follows:

1. An air bag assembly in a motor vehicle having an occupant seat mounted in the vehicle and an enclosure adjacent said occupant seat, said air bag assembly comprising:

an air bag having a front side wall and a back side wall, said front side wall being adjacent to and substantially parallel to said back side wall when said air bag is deflated so that said air bag is in an unfurled and unfolded position extending along said enclosure with said back side wall and said front side wall stored engaging one another, and an inflator actuable to inflate said air bag to an inflated position extending along said enclosure between the occupant and said enclosure.

2. An air bag assembly as stated in claim 1 including a duct connected to and in communication with said inflator and said air bag.

3. An air bag assembly in a motor vehicle having an enclosure with an upper portion and a lower portion and an occupant seat mounted to the vehicle adjacent said enclosure comprising:

an inflator mounted in said lower portion of said enclosure;

a flexible duct having a first end and a second end and having said first end connected to and in communication with said inflator;

an air bag having a front side and a back side and said front side being adjacent and substantially parallel to said back side when said air bag is deflated so that said air bag is in an unfurled and unfolded position extending along said upper portion of said enclosure, and said back side of said air bag being connected to and in communication with said second end of said flexible duct; and said inflator actuable to inflate said flexible duct and said air bag to an inflated position extending along said enclosure between the occupant and said enclosure.

4. An air bag assembly in a motor vehicle having a door with an upper portion and a lower portion and an occupant seat mounted in the vehicle adjacent said door comprising:

an inflator mounted in said lower portion of said door;

a flexible connecting air bag having a first end and a second end and having said first end connected to and in communication with said inflator;

said door having an inner trim panel and a soft trim material overlying said inner trim panel to provide a cavity between said inner trim panel and said soft trim material that extends along said upper portion of said door;

an air bag having a front side and a back side wherein said front side is adjacent to and substantially parallel to said back side when said air bag is deflated so that said air bag is stored in said cavity between said inner trim panel and said soft trim material and said cavity having a dimensional height sufficient to store said air bag therein without folding or furling said air bag;

said back side of said air bag being connected to and in communication with said second end of said connecting air bag; and said inflator actuable to inflate said flexible connecting air bag and said air bag to an inflated position extending along said door between the occupant and said door whereby said soft trim material yields to said air bag during inflation.

5. An air bag assembly as stated in claim 4 comprising:

said soft trim material having an edge along the periphery of said soft trim material; and said soft trim material being adhesively attached to said inner trim panel at said edge and said edge detaching from said inner trim panel upon said air bag inflating and pushing said soft trim material away from said inner trim panel so that said air bag fully inflates to a position between the occupant and said door.

6. An air bag assembly as stated in claim 4 comprising:
said soft trim material having an edge along the periphery of said soft trim material; and
said soft trim material being stapled to said inner trim panel at said edge and said edge detaching from said inner trim panel upon said air bag inflating and pushing said soft trim material away from said inner trim panel so that said air bag fully inflates to a position between the occupant and said door.

7. An air bag assembly as stated in claim 4 wherein said soft trim material has a weakened portion that tears upon said air bag inflating and pushing said soft trim material away from said inner trim panel so that said air bag fully inflates to a position between the occupant and said door.

* * * * *